Dec. 2, 1969  W. P. ALBURGER  3,481,310
PRESSURE INSERTABLE ANIMAL ACTUATED NIPPLE VALVE
Filed June 16, 1967
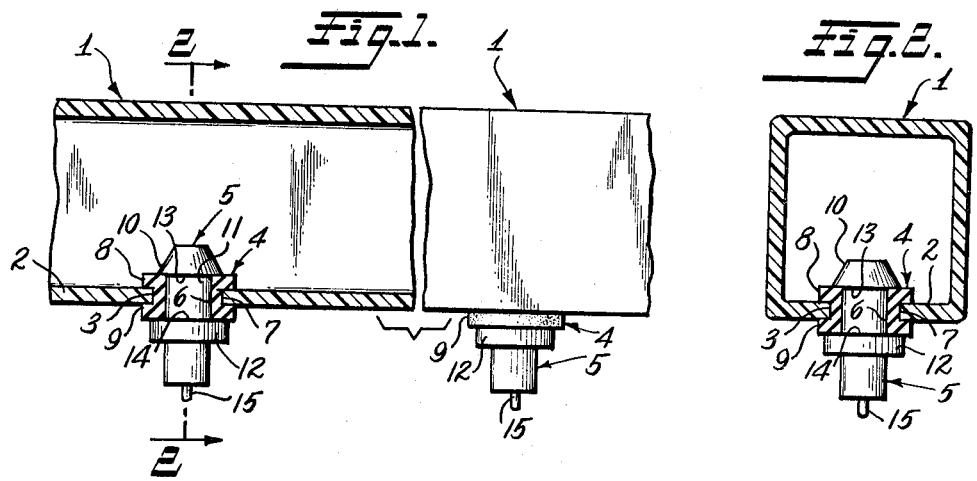
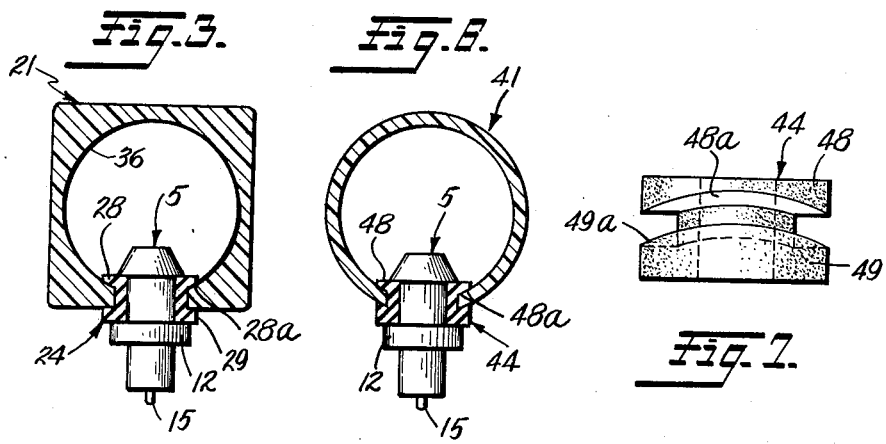
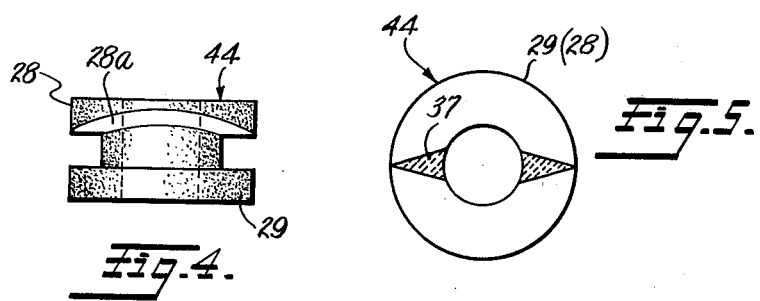
INVENTOR.
WILLIAM P. ALBURGER
BY
Arnold, Roylance, Kruger & Durkee
ATTORNEYS United States Patent Office 3,481,310
Patented Dec. 2, 1969

3,481,310
PRESSURE INSERTABLE ANIMAL
ACTUATED NIPPLE VALVE
William P. Alburger, Hatfield, Pa., assignor to Fox
Products Company, Philadelphia, Pa., a corporation of Pennsylvania
Filed June 16, 1967, Ser. No. 646,663
Int. Cl. A01k 7/02; F16k 31/58
U.S. Cl. 119—72.5                             3 Claims

ABSTRACT OF THE DISCLOSURE

In a poultry waterer of the type in which an elongated conduit of rigid polymeric material is provided with longitudinally spaced ports and a plurality of nipple valves are mounted on the conduit each to conduct water on demand through a different one of the ports, the valves are releasably secured to the conduit in fluid-tight relation each by means of an elastomeric grommet having a cylindrical portion held in radial compression between a rigid body portion of the valve and the peripheral wall of the port, the grommet being retained between spaced annular shoulders on the valve body and having annular end flanges which engage the inner and outer surfaces of the pipe, respectively, adjacent the peripheral wall of the port. Embodiments are provided in which the conduit has both inner and outer rectangular transverse cross-sectional configurations, in which the conduit is outwardly rectangular and has a cylindrical inner surface, and in which the conduit is fully cylindrical.

---

This invention relates to poultry waterers of the type employing nipple valves and, more particularly, to an improved watering device comprising an elongated conduit carrying a spaced series of nipple valves secured to the conduit in an improved manner.

In such waterers, the nipple valves are very small units which must be secured to the conduit in such fashion as to deliver water from the conduit only on demand of the fowl. Typically, the valve has a movable stem with an exposed end portion, so that the fowl can engage the stem and operate the same with its beak. Valves of this type are described, for example, in U. S. patent application Ser. No. 561,899, filed June 30, 1966, now Patent No. 3,418,977, by James B. Godshalk. In most cases, the water conduit is provided with a lateral port or each valve, and the body of the valve extends through the port. The industry has adopted extruded polymeric pipe as the conduit, and the extruded product is frequently essentially rigid. Thus, for example, it is a common practice to employ rigid polyvinyl chloride as the polymeric material for the extruded conduit, and conduits of this material are available with a rectangular transverse cross-section, as well as with a circular cross-section. Due to the small size of the valve, the cross-sectional configuration of the conduit, and the nature of the polymeric material of which the rigid conduit is made, it has proved difficult to devise a fully satisfactory way to secure the valves to the conduit when the conduit is of the rigid type.

Prior-art workers have attempted to solve this problem in various ways. Thus, it has been proposed to cement the valve body to the conduit, but this has been difficult to accomplish in the field and has had the additional disadvantage that the valves cannot easily be removed from the conduit for inspection or servicing. It has also been proposed to employ a threaded joint between the valve body and the conduit, but this has not been practical because of the thinness of the conduit wall.

It is accordingly a general object of this invention to devise an improved poultry waterer of the type wherein a plurality of small valves are spaced along and secured to a rigid extruded polymeric conduit and, particularly to provide such a device wherein the valves are easily and simply installed.

Another object is to provide a watering device of the type described wherein the valves can be removed from the conduit easily for inspection and service and can be re-installed simply by being pressed into place.

Stated generally, the invention is based on the discovery that small nipple valves and the like can be both adequately secured to and sealed in water-tight fashion to a rigid polymeric conduit by providing the conduit with a port to accommodate the valve, inserting an elastomeric grommet in the port, providing spaced transverse shoulders on the valve body which are separated by an annular outer surface portion, and pushing the valve body through the grommet until the grommet is engaged between the shoulders and itself embraces the annular outer surface portion between the flanges, the elastomeric material of the grommet being held in radial compression between the annular outer surface portion of the valve body and the peripheral wall of the port.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a view, partly in side elevation and partly in longitudinal section, of a poultry watering device in accordance with one embodiment of the invention;

FIG. 2 is a transverse sectional view taken on line 2—2, FIG. 1, with a valve employed in the device shown in side elevation;

FIG. 3 is a transverse sectional view, similar to FIG. 2, of a poultry watering device in accordance with another embodiment;

FIG. 4 is a side elevational view of an elastomeric grommet employed in the device of FIG. 3;

FIG. 5 is a plan elevational view of the grommet of FIG. 4;

FIG. 6 is a transverse sectional view, similar to FIGS. 2 and 3, of a poultry watering device in accordance with yet another embodiment; and FIG. 7 is a side elevational view of a grommet employed in the device of FIG. 6.

Turning now to the drawings in detail, and first to FIGS. 1 and 2 thereof, this embodiment of the invention comprises and elongated conduit 1 extruded from rigid polyvinyl chloride, for example, and having a square transverse cross-section, as seen in FIG. 2. Conduit 1 can be greatly elongated, and can consist of a single continuous extrusion or of a number of sections joined together in any conventional fashion. Such conduits are ordinarily installed in a generally horizontal position, with one of the side walls, as indicated at 2, facing downwardly and therefore constituting the bottom wall of the installed conduit. Bottom wall 2 is provided with a plurality of longitudinally spaced circular apertures or ports 3 which are centered transversely, as seen in FIG 2. Each port 3 accommodates the combination of a resilient grommet 4 and a valve 5. Formed of elastomeric material, such as butyl rubber, each grommet 4 has a central tubular body which presents a cylindrical central bore 6 and an intermediate outer cylindrical surface portion 7. Outwardly projecting transverse annular flange portions 8 and 9 are provided at the respective ends of the grommet, the inner faces of the flange portions coating with outer surface portion 7 to define a transverse annular outwardly opening groove. The outer faces of the flange portions lie respectively in the same planes as the ends of the central tubular body of the grommet. Being of elastomeric material, and therefore decidedly resilient, each grommet can be resiliently deformed and inserted through a different one of the ports 3, so that the portions of wall 2 defining the port come into engagement between the flange portions 8 and 9 and the peripheral edge of the port embraces outer surface portion 7.

Valves 5 are identical and can be made in accordance with the aforementioned copending U. S. patent application Ser. No. 561,899. Each valve includes a valve body having an inlet end portion 10, an intermediate portion 11, and a transverse annular outwardly projecting flange 12. The outer surface of inlet end portion 10 is frusto-conical, tapering toward the tip of the inlet end of the valve body. The outer surface of portion 11 of the valve body is cylindrical and of a diameter distinctly smaller than the larger end of the inlet end portion of the valve body, so that a transverse annular shoulder 13 is provided which faces toward flange 12. Flange 12 presents an opposing transverse annular outwardly projecting shoulder 14 which faces toward shoulder 13.

The diameter of the central bore 6 of grommet 4 is, when the grommet is in relaxed condition, significantly smaller than the diameter of the cylindrical intermediate body portion 11 of the valve 5. The diameter of cylindrical outer surface portion 7 of the grommet, when the grommet is relaxed, is approximately equal to the diameter of port 3 so that, when grommet 4 is inserted in port 3, with valve 5 not yet present, the grommet is at least approximately in its relaxed, undistorted condition. Valve 5 is forced inwardly through the grommet, after the grommet has been inserted into port 3, the maximum diameter of inlet end portion 10 of the valve body being sufficiently smaller than the diameter of port 3 to allow the inlet end of the valve body to pass completely through the port and grommet, so that the grommet becomes engaged between shoulders 13 and 14, with the central portion of the grommet now being held in radial compression between portion 11 of the valve body and the peripheral wall of port 3. The valve is thus secured by what is, in effect, an interference fit between the peripheral wall of the port, the grommet, and the valve body. Maintaining the central portion of the grommet under radial compression not only increases this interference fit but also assures adequate sealing pressure about the entire peripheral wall of the port and also about the cylindrical outer surface of portion 11 of the valve body. Hence, water flowing in conduit 1 at a level adequate to submerge the inlet ends 10 of the valves can escape only via the valve and is prevented from seeping around the valve bodies.

As fully described in the aforementioned copending application Ser. No. 561,899, each valve can be equipped with a moveable cam having a downwardly projecting end portion 15 which can be manipulated by the beak of the fowl to cause water to flow through the valve.

While the side walls of conduit 1, FIGS. 1 and 2, are flat and of uniform thickness, conduits of other configurations can be employed. Thus, as seen in FIG 3, the conduit 21 can have the same exterior configuration as conduit 1, FIG. 1, but can have a cylindrical inner surface 26. With a conduit of this configuration, the grommet 24, seen in detail in FIG. 4, has one flange portion 29 which is flat as in the case of flange portion 9, FIG. 1, but the other flange portion 28 has an inner face 28a which extends as a cylindrical surface of such diameter as to be capable of mating in flush contact with the inner surface 26 of the conduit 21. Grommet 24 is inserted into the port 23 in the same fashion hereinbefore described, save that it is necessary to orient the grommet rotationally to bring surface 28a into flush engagement with surface 26. To aid in this regard, the outer face of flange portion 29 is advantageously provided with position indicating means, here illustrated as a distinctly colored pointer 37 formed simply as a differently colored portion of the outer face of flange portion 29. When the grommet is inserted into the port, it is simply rotated manually until pointer 37 is directed longitudinally relative to conduit 21.

In the embodiment shown in FIGS. 3–5, the valves 5 remain precisely as described with reference to FIGS. 1 and 2 and the relation of the valve to the grommet and conduit port remains unchanged.

FIGS. 6 and 7 illustrate yet another embodiment of the invention employing a conduit 41 which has both a cylindrical outer surface and a cylindrical inner surface. In this embodiment, the inner faces 48a and 49a of grommet flange portions 48 and 49, respectively, both extend as cylindrical surfaces and are mutually parallel. The configuration of surfaces 48a and 49a of grommet 44 is such that, when the grommet is inserted in one of the ports 43 in conduit 41 and is rotationally oriented in proper fashion, as by using a position indicator of the type seen in FIG. 5, surfaces 48a and 49a will mate in flush engagement with the inner and outer cylindrical surfaces of the conduit.

Particularly advantageous embodiments of the invention have been chosen for illustrative purposes and it will be understood by those skilled in the art that various changes and modifications can be made therein without departing from the scope of the invention.

What is claimed is:

1. In a poultry watering device, the combination of an elongated extruded conduit of rigid polymeric material, at least the inner surface of said conduit being of circular transverse cross-section, said conduit having a plurality of laterally opening circular ports spaced therealong; and a plurality of animal actuated nipple valves each comprising a body having an inlet end and an outlet end, each of said bodies carrying outer grommet means of elastomeric material including a body portion and a pair of spaced annular flanges each extending transversely outwardly from a different end of said body portion, the one of said flanges adjacent the inlet end of the body having an annular surface which faces the other of said flanges, said annular surface extending cylindrically and being convex with respect to said other flange;

each of said valves being disposed with its body extending through a different one of said ports and with said inlet end of the body disposed within said conduit, said flanges of said grommet means respectively engaging the inner and outer surface portions of said conduit which are adjacent the one of said ports through which the body of the valve extends, said grommet means including position indicating means observable from the outlet end of the valve, whereby one installing the valve in said conduit can be guided in rotationally adjusting the body and grommet means of the valve to bring said annular surface of the grommet means into flush engagement with the inner surface of said conduit.

2. A poultry watering device according to claim 1 wherein
    the outer surface of said conduit is of rectangular transverse cross-section.

3. A poultry watering device according to claim 1 wherein
    each of said bodies is rigid and comprises an at least generally cylindrical outer surface portion terminating at one end at said inlet end of the body and at the other end at a transverse annular outwardly projecting flange on the body, said inlet end of the body and said last-mentioned flange presenting mutually opposed, flat, transverse annular surfaces; and said grommet means is a separate element retained by the said mutually opposed surfaces.

References Cited

UNITED STATES PATENTS

| | | | |
|---|---|---|---|
| 2,454,707 | 11/1948 | Meyers et al. | 285—192 X |
| 2,486,729 | 11/1949 | Beckley | 119—72.5 |
| 2,731,028 | 1/1956 | McCord | 137—223 |
| 2,772,034 | 11/1956 | Richmond | 285—192 X |
| 3,159,176 | 12/1964 | Russell et al. | 137—493.1 |
| 3,263,652 | 8/1966 | Nakajima et al. | 119—72.5 |
| 3,272,542 | 9/1966 | Haulik et al. | 251—145 X |
| 3,374,805 | 3/1968 | Trevarrow | 137—525 |

ALDRICH F. MEDBERY, Primary Examiner

U.S. Cl. X.R.

137—454.2, 525; 251—145; 285—189, 192